United States Patent
Hussain et al.

(10) Patent No.: US 9,571,412 B2
(45) Date of Patent: Feb. 14, 2017

(54) SYSTEMS AND METHODS FOR HARDWARE ACCELERATED TIMER IMPLEMENTATION FOR OPENFLOW PROTOCOL

(71) Applicant: CAVIUM, INC., San Jose, CA (US)

(72) Inventors: Muhammad Raghib Hussain, Saratoga, CA (US); Vishal Murgai, Cupertino, CA (US); Manojkumar Panicker, Sunnyvale, CA (US); Faisal Masood, San Jose, CA (US); Richard Eugene Kessler, Northborough, MA (US)

(73) Assignee: CAVIUM, INC., San Jose, CA (US)

( * ) Notice: Subject to any disclaimer, the term of this patent is extended or adjusted under 35 U.S.C. 154(b) by 126 days.

(21) Appl. No.: 14/681,978

(22) Filed: Apr. 8, 2015

(65) Prior Publication Data

US 2016/0149819 A1   May 26, 2016

Related U.S. Application Data

(60) Provisional application No. 62/083,074, filed on Nov. 21, 2014.

(51) Int. Cl.
*H04L 12/863* (2013.01)
*H04L 12/841* (2013.01)
*H04L 12/721* (2013.01)
*H04L 12/741* (2013.01)

(52) U.S. Cl.
CPC ........... *H04L 47/6215* (2013.01); *H04L 45/38* (2013.01); *H04L 45/54* (2013.01); *H04L 47/28* (2013.01); *H04L 47/623* (2013.01)

(58) Field of Classification Search
CPC ........ H04L 12/24; H04L 12/56; H04L 12/713; H04L 12/841; H04L 12/931; H04L 45/586; H04L 47/28; H04L 47/6215; H04L 49/70
See application file for complete search history.

(56) References Cited

U.S. PATENT DOCUMENTS

2009/0161547 A1* 6/2009 Riddle .................... G06F 9/526
370/236

* cited by examiner

*Primary Examiner* — Andrew Lai
*Assistant Examiner* — Leon Andrews

(57) ABSTRACT

A new approach is proposed to support a virtual network switch, which is a software implementation of a network switch utilizing hardware to accelerate implementation of timers of the virtual network switch under OpenFlow protocol. The approach utilizes a plurality of hardware-implemented timer blocks/rings, wherein each of the rings covers a specified time period and has a plurality of timer buckets each corresponding to an interval of expiration time of timers. When a new flow table entry is programmed at an OpenFlow agent of the virtual network switch, its associated timer entries are created and inserted into the corresponding timer bucket based on the expiration time of the timers. During operation, hardware of the virtual network switch traverses the timer rings for the timer bucket which time has expired, identifies timer entries in the expired timer bucket, interrupts CPU or provides a notification to the agent with necessary contextual information.

36 Claims, 2 Drawing Sheets

SYSTEMS AND METHODS FOR HARDWARE ACCELERATED TIMER IMPLEMENTATION FOR OPENFLOW PROTOCOL

CROSS-REFERENCE TO RELATED APPLICATIONS

This application claims the benefit of U.S. Provisional Patent Application No. 62/083,074, filed Nov. 21, 2014, and entitled "Hardware acceleration for Openflow protocol implementation," which is incorporated herein in its entirety by reference.

BACKGROUND

OpenFlow protocol is a communications protocol that gives a remote controller access to the packet forwarding plane of a network switch or router over the network. It enables the remote controller to determine the routing path of network packets through the network switch by adding, modifying and removing packet matching rules and actions from the packet forwarding (or flow) tables of the network switch as described below. The OpenFlow protocol separates the high level routing decision plane (control path) from the packet forwarding plane (data path) of the network switch, wherein the data path still resides on the network switch while the control path is moved to the separate remote controller, typically a standard server. The switch and the controller communicate with each other via the OpenFlow protocol, which defines types of messages, such as packet-received, send-packet-out, modify-forwarding-table, and get-stats, being exchanged between the network switch and the controller. The OpenFlow protocol thus allows for more sophisticated traffic management of the network switch than what is feasible using access control lists (ACLs) and routing protocols. In addition, OpenFlow protocol allows network switches from different suppliers—often each with its own proprietary interfaces and scripting languages—to be managed remotely using a single, open protocol.

Under the OpenFlow protocol, the data path of the network switch presents a clean flow table, wherein each flow table entry contains a set of fields that include but are not limited to, matching fields with a packet received, priority, counters, instructions for action on the packet (such as send-out-port, modify-field, or drop) based on the matching result, timeouts and cookie for the action (as shown below).

| Match fields | Priority | Counters | Instructions | Timeouts | Cookie |
|---|---|---|---|---|---|

When the network switch receives a packet it has never seen before, for which there are no matching flow table entries, it sends the packet to the controller, which then makes a decision on how to handle this packet. The controller may either drop the packet or add a flow table entry directing the network switch on how to forward similar packets in the future.

Under the OpenFlow protocol, flow table entries are removed from the flow tables either at the request of the controller or using a flow timeout mechanism, which is run by the network switch independently of the controller and is based on the state and configuration of flow entries as shown above. In some embodiments, each flow entry has two associated timers that control the timeout and removal of the entries from the flow table:

Idle timeout timer: if non-zero and idle (e.g., there are no packets) for a specified period of time (measured in number of seconds), the corresponding flow entry is removed from the flow table.

Hard timeout timer: if non-zero, the network switch must record the flow entry's creating/arrival time in the flow table, and use it for eviction from the flow table after a maximum time period.

Since there are typically several hundred thousand or millions of flow table entries programmed in the flow tables of a network switch, each having multiple individual timers, the potential timers used under the OpenFlow protocol is huge and would put extremely heavy load on the CPU/memory resources of the system (e.g., the controller) to implement and process so many timers via software. As a result, guaranteeing accuracy and predictability of these timers would be extremely difficult. Since large numbers of flow table entries time out at or around the same time, data path traffic for the corresponding flow tables could get impacted due to jitter/latency in handling the timers, leading to undesired networking and/or administration misbehavior. Therefore, there is a need for an improved system and method to enable accelerated implementation of the timers in the network switch under the OpenFlow protocol.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
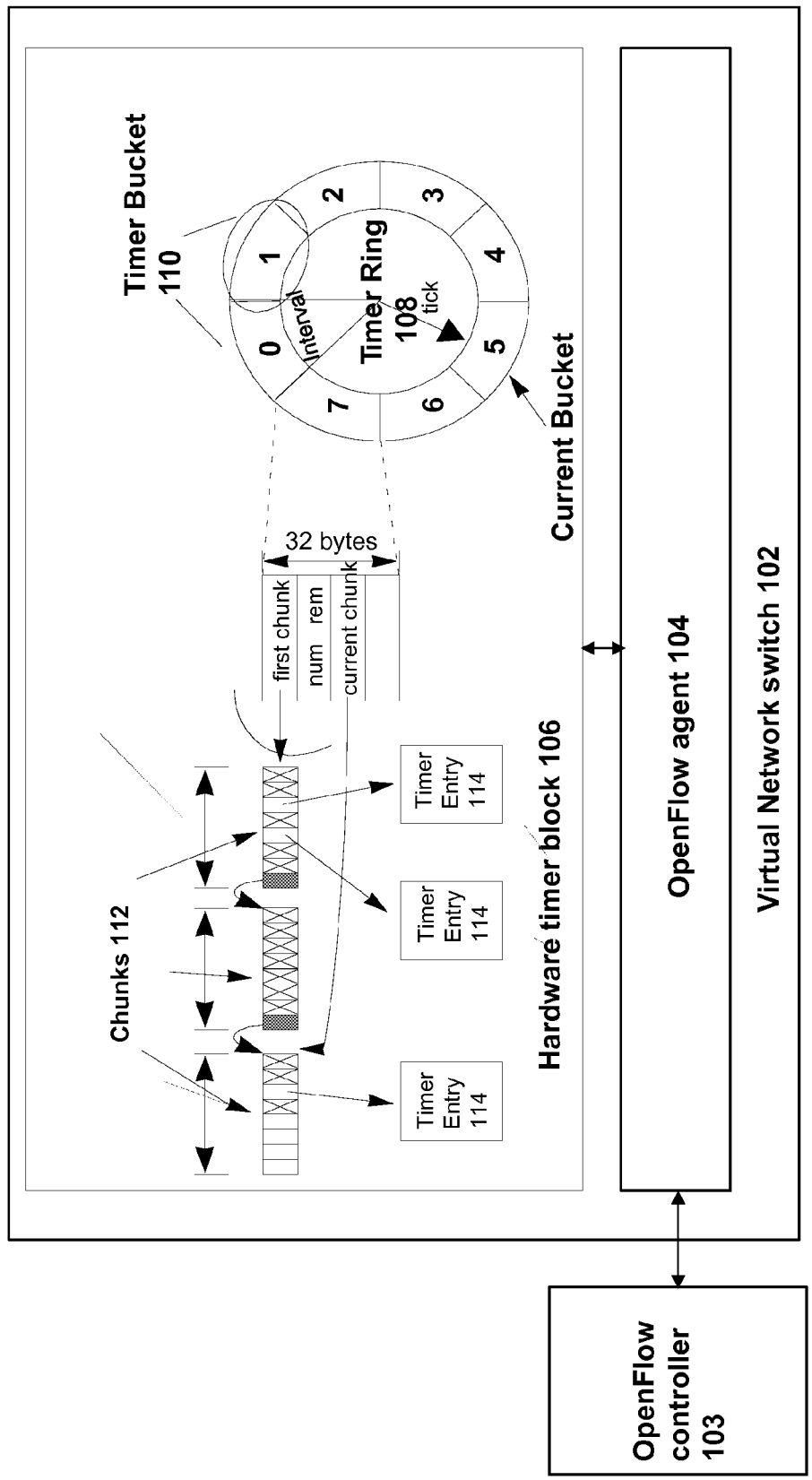
FIG. 1 depicts an example of a diagram of a system to support hardware accelerated timer implementation for a virtual network switch under OpenFlow protocol in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support a virtual network switch, which is a software implementation of a network switch utilizing hardware to accelerate implementation of timers of the virtual network switch under OpenFlow protocol. Specifically, the proposed approach utilizes a plurality of hardware-implemented timer blocks/rings, wherein each of the rings covers a specified period of time and has a plurality of timer buckets each corresponding to an interval/period of expiration time of timers of flow table entries of the virtual network switch. Here, each bucket in a timer ring includes pointers to entries of a set of timers having expiration time within the same time interval. When a new flow table entry is programmed at an OpenFlow agent of the virtual network switch, its associated timer entries are created and inserted into the corresponding timer bucket in the timer ring based on the expiration time of the timers. During operation, hardware of the virtual network switch traverses the timer rings for the timer bucket which time has expired, identifies timer entries in the expired timer bucket, interrupts CPU or provides a notification/callback to the OpenFlow agent with necessary contextual information, and frees up memory space occupied by the expired timer bucket.

By maintaining the timers created for the virtual network switch under OpenFlow protocol in memory and offloading the processing of the timers to hardware of the virtual network switch, the proposed approach enables hardware accelerated implementation of the timers. Such hardware accelerated implementation eliminates the heavy load imposed on the CPU/memory resources of the system caused by processing of a large number of timers under software implementation and avoids network jitter/latency. As a result, the proposed approach improves the accuracy and predictability of the timers even when a huge number of timers are processed at approximately the same time.

FIG. 1 depicts an example of a diagram of a system to support hardware accelerated timer implementation for a virtual network switch under OpenFlow protocol. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the virtual network switch 102 includes at least an OpenFlow agent 104 implemented on one or more hardware timer blocks/rings 106. Here, the OpenFlow agent 104 is a software component running on a multi-core embedded hardware module having software, firmware, hardware, or another component that is used to effectuate a purpose. For non-limiting examples, the virtual network switch 102 with its OpenFlow agent 104 runs on OCTEON/ARM based systems/cores/servers. The hardware timer blocks 106 can be part of the multi-core embedded hardware comprising one or more of coprocessors/hardware cores, a memory (also referred to as primary memory) such as RAM, and a storage unit such as a non-volatile memory (also referred to as secondary memory) with software instructions stored in for practicing one or more processes.

In some embodiments, an optional OpenFlow controller 103 is utilized to communicate and control operations of the OpenFlow agent 104, wherein the OpenFlow controller 103 runs on x86, OCTEON and/or ARM based systems/cores/servers. The OpenFlow controller 103 and the virtual network switch 102 communicate with each other and other devices/hosts/servers over a network (not shown) following certain communication protocols such as TCP/IP protocol. Such network can be but is not limited to, internet, intranet, wide area network (WAN), local area network (LAN), wireless network, Bluetooth, WiFi, mobile communication network, or any other network type. The physical connections of the network and the communication protocols are well known to those of skill in the art.

In the example of FIG. 1, the hardware timer block 106 includes a plurality of timer subsystems 108 referred to herein as timer rings, which are created, programmed, and maintained in memory by the OpenFlow agent 104 for running on the virtual network switch 102. Here, the hardware timer block 106 may include one or more coprocessors/cores and memory units. Each timer ring 108 further includes a plurality of timer buckets 110 organized sequentially in memory to form a ring-like structure, wherein each timer bucket 110 covers a time interval (time between timer bucket traversals) specified by the timer ring 108 during which a group of timers will expire. As such, each timer ring 108 covers a certain time period comprising of a plurality of consecutive time intervals during which timers will expire. As shown in the example of FIG. 1, each timer bucket 110 contains pointers to a linked list of chunks 112 (e.g., the first chunk, the current chunk, and number of chucks), wherein each chunk 112 includes a plurality of pointers to timer entries 114, which each occupies a set of bytes (e.g., 16 bytes) in memory for information related to a timer associated with a flow table entry as discussed above. Here, the timer rings 108, the timer buckets 110 in each timer ring and the chunks 112 in each timer bucket are maintained in a memory unit (not shown), wherein the memory unit can be but is not limited to level 2 (L2) cache, Dynamic random-access memory (DRAM), Static random-access memory (SRAM), and flash memory.

In some embodiments, the OpenFlow agent 104 is configured to allocate one timer ring 108 to each hardware core implementing the virtual network switch 102 for hardware-based processing of the timers in the timer ring and to avoid locking and synchronization between different hardware cores implementing the virtual network switch 102. Each core may then dynamically allocate memory space for the timer chunks 112 and its timer entries 114 in the timer ring 108.

In some embodiments, the number of timer buckets 110 per timer ring 108, the number of chunks 112 per timer bucket 110, and the number of timer entries 114 per chunk 112 are programmable and can be configured by the OpenFlow agent 104. In some embodiments, the OpenFlow agent 104 is configured to program the configuration parameters specific to each timer ring 108 via a plurality of registers, wherein the configuration parameters include but are not limited to, enabling signal of the timer ring 108, time interval and number of timer buckets 110 within the timer ring 108, base pointer/memory address of the starting timer bucket 110 in the timer ring 108, timing ticks of the current timer bucket 110 being processed in the timer ring 108 (counts of number of ticks before the timers in the current timer bucket 110 expire), next time increment to the next timer bucket 110 in the in the timer ring 108, size of each chunk 112 (number of pointers to timer entries 114 in each chunk) in the timer bucket 110. Here, the enable signal of the timer ring 108 indicates whether the timer ring 108 is ready for read/process, or to be freed from memory, or in periodic mode discussed below.

During operation, the OpenFlow agent 104 is configured to create the timer entries 114 for the timers of newly inserted flow table entries and insert/add the timer entries 114 into a chunk 112 of the timer bucket 110 corresponding to the expiration time of the timers. In some embodiments, each timer entry 114 further includes contextual information of the timer (e.g., information and/or pointer to the flow table entry associated with the timer). At some point after a timer entry is added to a timer ring, but not while or after the hardware timer block 106 traverses the list of timer entries 114 in the timer bucket 110, the OpenFlow agent 104 is configured to invalidate the timer entry before it expires by writing its bytes to all zeros. For a non-limiting example, up to 400 million timer entries can be invalidated per second. In that case, the hardware timer block 106 will not submit the invalidated timer entry for processing (e.g., schedule notifications).

In some embodiments, the OpenFlow agent 104 is configured to determine the timer bucket 110 to insert the timer entries 114 based on counts of clock cycles of coprocessor or hardware core implementing the virtual network switch 102. Alternatively, the OpenFlow agent 104 is configured to obtain the position of the timer bucket 110 to insert the set of timer entries 114 directly from the pointer to the current timer bucket. Note that the current timer bucket points to the timer bucket 110 currently being read by the hardware timer block 106, which may advance during the brief time it takes for the hardware timer block 106 to traverse the timer entries 114 in the current timer bucket.

During operation, the hardware timer block 106 implementing the virtual network switch 102 is configured to initialize expiration time of a timer bucket 110 in a timer ring 108 by setting the timing expiration offset of the timer ring 108 to current time plus the time interval. The hardware timer block 106 may count the current time by either time ticks elapsed based on internal clock cycles or general-purpose input/output (GPIO) edges/pin transitions of the virtual network switch 102. When the current time reaches the timing expiration offset, the timers in the current timer bucket 110 expire. Upon expiration of the current timer bucket 110, the hardware timer block 106 is configured to traverse the timer entries in the chunks 112 of the current time bucket 110. In some embodiments, the hardware timer block 106 is configured to traverse the timer entries in multiple timer rings 108 in parallel. For all timer entries in the current time bucket 110's list of chunks 112 that are still valid, the hardware timer block 106 schedules notifications to the OpenFlow agent 104 to perform the instructions in the flow table entries associated with the timers. For a non-limiting example, up to 120 million notification entries can be scheduled per second. In some embodiments, the hardware timer block 106 is also configured to free and initialize the list of chunks 112 and timer entries 114 in the chunks 112 in the current time bucket 110 once they expire to the memory pool managed by memory manager of the hardware timer block 106 for subsequent use unless the timer ring 108 is marked as not to be freed or in periodic mode as discussed below.

In some embodiments, the hardware timer block 106 is configured to configure a timer ring 108 to repeat events/ timers in its timer buckets 110 on a periodic basis. When the hardware timer block 106 implementing the virtual network switch 102 traverses the list of timer entries 114 in the timer ring 108 set in periodic mode, these timer entries 114 are neither modified nor freed from memory. Instead, these timers are scheduled again at the next time when the time tick wraps around the timer ring 108 and reaches the timers in the same timer bucket 110 again, creating a periodically repeating behavior.

In some embodiments, the hardware timer block 106 implementing the virtual network switch 102 is configured to set an interrupt bit/mark to pause the time tick when the timer interval of a timer ring 108 is too short for the hardware timer block 106 to traverse the list of timer entries 114 in the timer buckets 110. Such interrupt setting would not be necessary if the timer interval is set large enough for the hardware timer block 106 to traverse through the list of timer entries 114 in the timer buckets 110.

In some embodiments, the OpenFlow agent 104 is configured to allocate enough memory to account for the chunks 112 that would be needed to hold the maximum number of time entries 114 that the system may need to support. If a chunk 112 could not be allocated, the proposed mechanism may not be able to add more entries, in which case the OpenFlow agent 104 is configured to add more buffers for the chunks 112 and to retry the addition of the timer entries 114. Note that OpenFlow agent 104 would need to consider additional time spent in memory allocation and adjust the timer entry settings accordingly. Upon expiration of a timer, the cores implementing the virtual network switch 102 can be interrupted to inform them of the expired timer entries 114. Alternately, information passed by the OpenFlow agent 104 during timer registration can be passed back to the OpenFlow agent 104 during the expired timer notification. For a non-limiting example, the OpenFlow agent 104 could supply a pointer to the timer entry 114 with relevant context information embedded in it when the timer entry 114 is created. This information can be returned to the OpenFlow agent 104 upon timer expiration to provide the OpenFlow agent 104 with the required context to process the notification.

Figure 2:
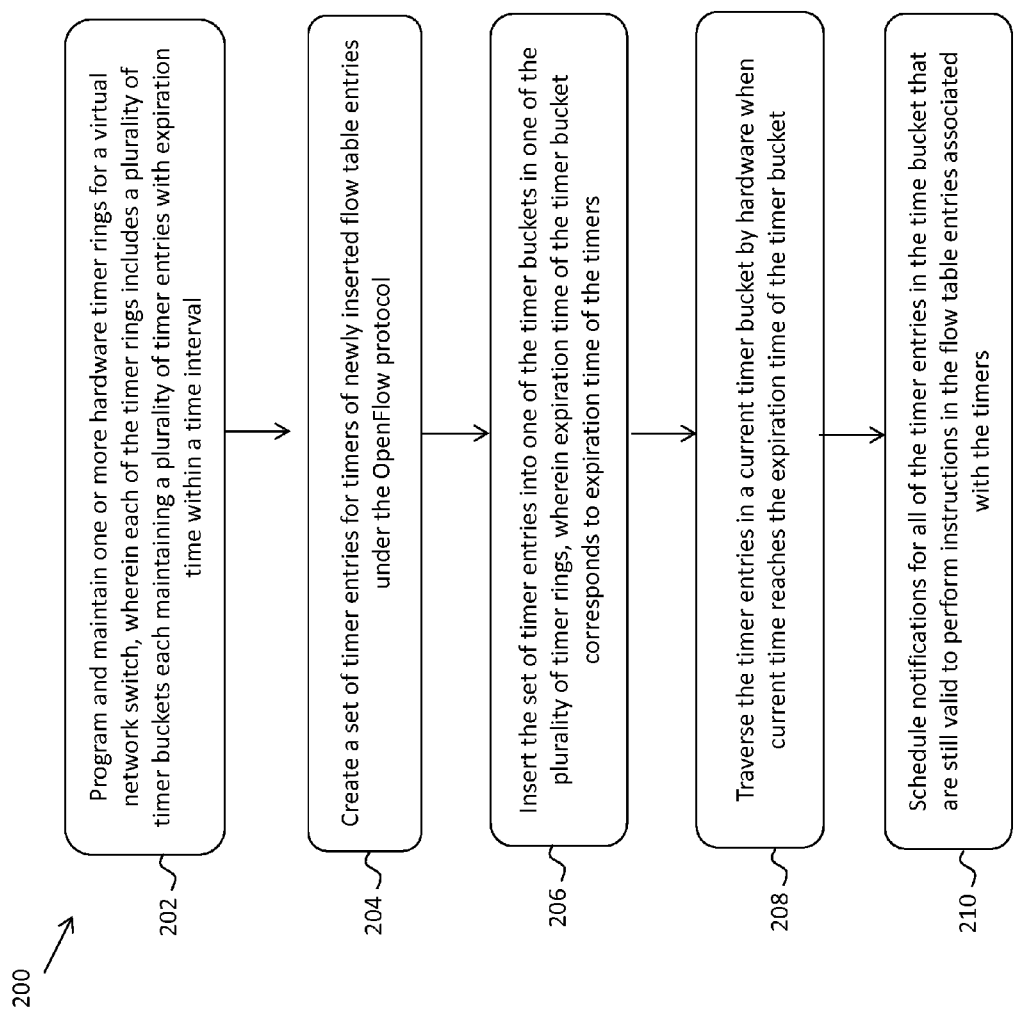
FIG. 2 depicts a flowchart of an example of a process to support hardware accelerated timer implementation for a virtual network switch under OpenFlow protocol in accordance with some embodiments.

FIG. 2 depicts a flowchart of an example of a process to support hardware accelerated timer implementation for a virtual network switch under OpenFlow protocol. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202, where one or more hardware timer rings are programmed and maintained for a virtual network switch, wherein each of the timer rings includes a plurality of timer buckets each maintaining a plurality of timer entries with expiration time within a time interval. The flowchart 200 continues to block 204, where a set of timer entries are created for timers of newly inserted flow table entries under the OpenFlow protocol. The flowchart 200 continues to block 206, where the set of timer entries are inserted into one of the timer buckets in one of the plurality of timer rings, wherein expiration time of the timer bucket corresponds to expiration time of the timers. The flowchart 200 continues to block 208, where timer entries in a current timer bucket are traversed by hardware when current time reaches the expiration time of the timer bucket. The flowchart 200 ends at block 210, where notifications are scheduled for all of the timer entries in the time bucket that are still valid to perform instructions in the flow table entries associated with the timers.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A system to support hardware accelerated timer implementation for a virtual network switch under OpenFlow protocol, comprising:
    an OpenFlow agent configured to:
        program and maintain one or more hardware timer rings for the virtual network switch, wherein each of the hardware timer rings includes a plurality of timer buckets each maintaining a plurality of timer entries of timers which expiration times are within a time interval of the timer bucket;
        create a set of timer entries for a plurality of timers of newly created flow table entries under the OpenFlow protocol;
        insert the set of timer entries into one of the timer buckets in one of the hardware timer rings, wherein the time interval of the timer bucket corresponds to expiration times of the timers;
    said hardware timer rings for the virtual network switch each configured to:
        traverse the timer entries in a current timer bucket when current time reaches the time interval of the timer bucket;
        schedule notifications to the OpenFlow agent for all of the timer entries in the timer bucket that are still valid to perform instructions in the flow table entries associated with the timers.

2. The system of claim 1, wherein:
the OpenFlow agent runs on a multi-core embedded hardware module.

3. The system of claim 1, wherein:
the hardware timer rings include one or more coprocessors/cores and memory units implementing the virtual network switch.

4. The system of claim 1, further comprising:
an OpenFlow controller configured to communicate and control operations of the OpenFlow agent.

5. The system of claim 1, wherein:
the timers of the flow table entries under the OpenFlow protocol control timeout and removal of the flow table entries.

6. The system of claim 1, wherein:
the plurality of timer buckets in each of the hardware timer rings are organized sequentially in the memory to form a ring-like structure so that each of the hardware timer rings covers a certain time period comprising of a plurality of consecutive time intervals during which the timers will expire.

7. The system of claim 1, wherein:
each of the timer buckets contains pointers to a linked list of chunks, wherein each chunk includes a plurality of pointers to the timer entries.

8. The system of claim 1, wherein:
each of the timer entries further includes contextual information related to the flow table entry associated with one of the timers.

9. The system of claim 1, wherein:
the OpenFlow agent is configured to allocate one hardware timer ring to each hardware core implementing the virtual network switch for hardware-based processing of the timer entries in the hardware timer ring and to avoid locking and synchronization between different hardware cores implementing the virtual network switch.

10. The system of claim 1, wherein:
the OpenFlow agent is configured to program a plurality of configuration parameters specific to time interval, time tick, and size of each hardware timer ring and its timer buckets and chunks via a plurality of registers.

11. The system of claim 1, wherein:
the OpenFlow agent is configured to invalidate one or more of the timer entries before they expire at some point after they have been added to a timer bucket but not while or after one of the hardware timer rings traverses the timer entries in the timer bucket.

12. The system of claim 11, wherein:
the hardware timer rings- is configured not to submit the invalidated timer entries for processing.

13. The system of claim 1, wherein:
the OpenFlow agent is configured to determine the timer bucket to insert the set of timer entries based on counts of clock cycles of hardware cores implementing the virtual network switch.

14. The system of claim 1, wherein:
the OpenFlow agent is configured to obtain position of the timer bucket to insert the set of timer entries directly from pointer to the current timer bucket.

15. The system of claim 1, wherein:
the hardware timer rings are configured to initialize expiration time of the timer bucket by setting timing expiration offset to current time of its hardware timer ring plus the time interval of the timer bucket.

16. The system of claim 15, wherein:
the hardware timer rings are configured to count the current time by either timing ticks elapsed based on internal clock cycles or general-purpose input/output (GPIO) edges/pin transitions of the virtual network switch.

17. The system of claim 1, wherein:
the hardware timer rings are configured to traverse the timer entries in multiple hardware timer rings in parallel.

18. The system of claim 1, wherein:
the hardware timer rings are configured to free the chunks and timer entries in the chunks in the current timer bucket once they expire to the memory pool for subsequent use.

19. The system of claim 1, wherein:
the hardware timer rings are configured to configure a hardware timer ring to repeat events/timers which timer entries are in timer buckets of the hardware timer ring on a periodic basis.

20. The system of claim 19, wherein:
the hardware timer rings are configured not to modify or free timer entries in the hardware timer ring set in periodic mode and to schedule the timer entries again at the next time when time tick wraps around the hardware timer ring and reaches the timer entries in the same timer bucket again.

21. The system of claim 1, wherein:
the hardware timer rings are configured to set an interrupt bit to pause time tick when the timer interval of a hardware timer ring is too short for the hardware timer ring to traverse the list of timer entries in the timer buckets of the hardware timer ring.

22. A method to support hardware accelerated timer implementation for a virtual network switch under OpenFlow protocol, comprising:
programming and maintaining one or more hardware timer rings for the virtual network switch, wherein each of the hardware timer rings includes a plurality of timer buckets each maintaining a plurality of timer entries of timers which expiration times are within a time interval of the timer bucket;
creating a set of timer entries for a plurality of timers of newly inserted flow table entries under the OpenFlow protocol;
inserting the set of timer entries into one of the timer buckets in one of the hardware timer rings, wherein the time interval of the timer bucket corresponds to expiration times of the timers;
traversing the timer entries in a current timer bucket when current time reaches the time interval of the timer bucket;
scheduling notifications for all of the timer entries in the timer bucket that are still valid to perform instructions in the flow table entries associated with the timers.

23. The method of claim 22, further comprising:
organizing the plurality of timer buckets in each of the hardware timer rings sequentially in the memory to form a ring-like structure so that each of the hardware timer rings covers a certain time period comprising of a plurality of consecutive time intervals during which the timers will expire.

24. The method of claim 22, further comprising:
allocating one hardware timer ring to each hardware core implementing the virtual network switch for hardware-based processing of the timer entries in the hardware timer ring and to avoid locking and synchronization between different hardware cores implementing the virtual network switch.

25. The method of claim 22, further comprising:
programming a plurality of configuration parameters specific to time interval, time tick, and size of each hardware timer ring and its timer buckets and chunks via a plurality of registers.

26. The method of claim 22, further comprising:
invalidating one or more of the timer entries before they expire at some point after they have been added to a timer bucket but not while or after one of the hardware timer rings traverses the timer entries in the timer bucket.

27. The method of claim 26, further comprising:
not submitting the invalidated timer entries for processing.

28. The method of claim 22, further comprising:
determining the timer bucket to insert the set of timer entries based on counts of clock cycles of hardware cores implementing the virtual network switch.

29. The method of claim 22, further comprising:
obtaining position of the timer bucket to insert the set of timer entries directly from pointer to the current timer bucket.

30. The method of claim 22, further comprising:
initializing expiration time of the timer bucket by setting timing expiration offset to current time of the hardware timer ring plus the time interval of the timer bucket.

31. The method of claim 30, further comprising:
counting the current time by either timing ticks elapsed based on internal clock cycles or general-purpose input/output (GPIO) edges/pin transitions of the virtual network switch.

32. The method of claim 22, further comprising:
traversing the timer entries in multiple hardware timer rings in parallel.

33. The method of claim 22, further comprising:
freeing the chunks and timer entries in the chunks in the current timer bucket once they expire to the memory pool for subsequent use.

34. The method of claim 22, further comprising:
configuring a hardware timer ring to repeat events/timers which timer entries are in timer buckets of the hardware timer ring on a periodic basis.

35. The method of claim 34, further comprising:
not modifying or freeing timer entries in the hardware timer ring set in periodic mode and to schedule the timer entries again at the next time when time tick wraps around the hardware timer ring and reaches the timer entries in the same timer bucket again.

36. The method of claim 22, further comprising:
setting an interrupt bit to pause time tick when the timer interval of a hardware timer ring is too short for the hardware timer ring to traverse the list of timer entries in the timer buckets of the hardware timer ring.

* * * * *

UNITED STATES PATENT AND TRADEMARK OFFICE
CERTIFICATE OF CORRECTION

PATENT NO.         : 9,571,412 B2                           Page 1 of 1
APPLICATION NO.    : 14/681978
DATED              : February 14, 2017
INVENTOR(S)        : Muhammad Raghib Hussain et al.

It is certified that error appears in the above-identified patent and that said Letters Patent is hereby corrected as shown below:

In the Claims

Column 8, Line 35, insert -- each of -- before "the hardware timer",

Column 8, Line 35, delete "-" after "rings".

Signed and Sealed this
Eleventh Day of April, 2017

Michelle K. Lee
*Director of the United States Patent and Trademark Office*